US011915678B2

(12) United States Patent
Mah et al.

(10) Patent No.: US 11,915,678 B2
(45) Date of Patent: Feb. 27, 2024

(54) SOUND CONTROL DEVICE FOR MECHANICAL DEVICES AND METHOD OF USE

(71) Applicants: Richard J Mah, Bath, ME (US); Edward P Sullivan, Jr., Tewksbury, MA (US)

(72) Inventors: Richard J Mah, Bath, ME (US); Edward P Sullivan, Jr., Tewksbury, MA (US)

( * ) Notice: Subject to any disclaimer, the term of this patent is extended or adjusted under 35 U.S.C. 154(b) by 0 days.

(21) Appl. No.: 17/587,023

(22) Filed: Jan. 28, 2022

(65) Prior Publication Data

US 2022/0246124 A1 Aug. 4, 2022

Related U.S. Application Data

(60) Provisional application No. 63/144,110, filed on Feb. 1, 2021.

(51) Int. Cl.
*G10K 11/16* (2006.01)

(52) U.S. Cl.
CPC .................................. *G10K 11/161* (2013.01)

(58) Field of Classification Search
CPC ................................ A61C 1/05; G10K 11/161
USPC .......................................................... 181/230
See application file for complete search history.

(56) References Cited

U.S. PATENT DOCUMENTS 3,060,581 A * 10/1962 Aymar .................. A61C 1/052 433/104
3,381,378 A 5/1968 Lawrence et al.
4,521,190 A 6/1985 Nakayama et al.
4,568,642 A 2/1986 Deforrest et al.
5,031,508 A * 7/1991 Babyak .................... B21J 15/22 91/440
5,581,055 A * 12/1996 Self ........................... B25F 5/00 181/241
5,847,334 A * 12/1998 Taga ....................... B25B 21/02 181/230
5,992,540 A * 11/1999 Smolinski ............... F01C 13/02 173/171
6,062,323 A * 5/2000 Pusateri .................. B25B 21/00 173/221
6,152,736 A 11/2000 Schmidinger et al.
7,331,950 B2 2/2008 Tidwell et al.
7,357,619 B1 4/2008 Del
8,232,660 B2 * 7/2012 Ito ........................... F02B 63/04 310/58
2005/0103566 A1 * 5/2005 Sterling .................. B23B 47/00 181/252

(Continued)

FOREIGN PATENT DOCUMENTS

CN 201676024 U 12/2010
CN 205411348 U 8/2016

(Continued)

*Primary Examiner* — Jeremy A Luks

(57) ABSTRACT a sound control device for pneumatically driven mechanical devices and method of use of said device, the device configured to create a sealed intermediary gas medium between the atmosphere and surfaces of the pneumatically driven mechanical device where vibrational energy is generated and where exhaust flow travels, the sound control device further configured to carry such energy and exhaust away from the source where it may be released into the atmosphere in a quieter manner.

6 Claims, 3 Drawing Sheets

(56) References Cited

U.S. PATENT DOCUMENTS

| | | | | |
|---|---|---|---|---|
| 2005/0269152 | A1* | 12/2005 | Sellers | F01N 1/086 181/230 |
| 2008/0083582 | A1* | 4/2008 | Towne | F04B 39/0055 181/230 |
| 2009/0274992 | A1 | 11/2009 | Kim | |
| 2019/0192255 | A1* | 6/2019 | Rzeszotko | A61C 1/08 |

FOREIGN PATENT DOCUMENTS

| | | | |
|---|---|---|---|
| GB | 829892 | A | 3/1960 |
| WO | 9015581 | A1 | 12/1990 |
| WO | 2010076957 | A1 | 7/2010 |

* cited by examiner

SOUND CONTROL DEVICE FOR MECHANICAL DEVICES AND METHOD OF USE

BACKGROUND INFORMATION

Field of the Invention

The invention relates to devices that reduce the sound emitted by various classes of machinery and mechanical devices and methods of using such devices.

Discussion of Prior Art

Prior art related to this application of the method comes from the areas of sound management and dental drills. For example, Ito et al. in U.S. Pat. No. 8,232,660 B2 SOUND-PROOF ENCLOSED TYPE GENERATOR describes the use of directed air flow for sound reduction. In that application, fan forced air is drawn into a custom designed enclosure to cool a power generator. The enclosure is designed to direct that cooling air flow through a muffler chamber to reduce energy level before releasing it to atmosphere in the immediate vicinity of the working machine.

More specifically, the vibrational energy that causes oscillations in pressure in a gaseous medium, which may become audible sound if it is in the range of frequencies detectable by the human ear, may be created by rotating or reciprocating motion. The vibrational energy may also come from sources such as internal combustion.

For example, pneumatically driven mechanical devices, such as pneumatic drills, are devices that are powered by compressed air. Such devices are very common and very useful and include items such as drills, nailing and stapling guns, jack hammers, riveting guns, and sanders. In general, such devices are powered by air that is delivered from an air compressor and that is sent through a pressure regulator that sets the required pressure for operation of the particular device.

The technology around such devices has existed for some time. For example, U.S. Pat. No. 3,060,581 (the "581 Patent") dated Oct. 30, 1962 awarded to R. H. Aymar and E. R. Weiner detailed the 'DENTAL HANDPIECE WITH REMOVABLE TURBINE-AND-BEARING ASSEMBLY AND LIQUID COOLED BURR'. This device is more commonly known as a pneumatic dental drill and is used to remove material from teeth during a surgical procedure for the purpose of removing decayed areas of teeth in preparation for a filling of a material that may harden to make the repaired tooth usable like a normal healthy tooth. The first patents for an air driven dental drill were awarded in the 1950's.

The '581 Patent is the base concept behind the great majority of production dental drills in use today. Recent estimates conclude that approximately 76% of dentists use air driven turbine or pneumatic drills. The turbine shaft assembly integrates the turbine and bearings to the drill burr. The turbine shaft assembly is held within the drill head. Forced air is used to drive a turbine. The turbine provides the rotation for the drill burr, which does the actual work associated with the removal of material from tooth surfaces. The rotation of the drill burr and the load generated by the work done against teeth is transferred to the head of the drill through roller bearings that are mounted on the rotating shaft of the drill. The recommended drive air pressure for a pneumatic dental drill is 30 to 34 pounds per square inch ("PSI").

The sound that is emitted from these devices is problematic in many situations. For mechanical assemblies, such as pneumatically driven devices, vibrations pass through the interconnected components of the assembly to the surface of the device and transfer into the gas medium of atmospheric air, becoming audible sound. Vibrations are also carried in the exhaust airstream from pneumatically driven devices into atmospheric air. Vibrations are continuously generated while the device is in operation and may exhibit dynamic changes in their characteristic properties. The points of origin of these vibrations may move, and the vibrations may vary in both intensity and frequency/wavelength, as the devices operate.

In the case of the pneumatic dental drill, forced air is supplied through the handle of the device to drive a turbine shaft assembly. This drive air is caught by turbine blades, which causes the turbine shaft assembly to rotate allowing the device to perform work. One significant source of vibrations in pneumatic dental drills comes from the air flow over the turbine blades as that air flow creates the rotational motion to drive the drill burr.

The second major source of vibrations comes from the bearings on the drill burr shaft assembly that take up the work load from the drill burr. The bearings used in pneumatic dental drills are made from ceramic materials in order to run without lubrication. The lack of lubrication in addition to other operational characteristics of bearings causes friction and high vibrations that generate part of the sound coming off the device.

The air flow over the turbine, the load transfer from the speed of the non-lubricated ceramic bearings and the remaining operational features of the pneumatic dental drill generate sound pressure levels in the 70-80 decibels ("dBA") range. The sound is recognized as a piercing high pitch whine. This noise level contributes to patient anxiety associated with dental procedures, and may result in potential hearing loss to drill operators.

Primary sources of noise in the pneumatic dental drill are the vibrations from air passing over the tips of the turbine blades as the shaft assembly rotates and from load being taken up by the bearings. There is the load from the rotating turbine and load from the drill burr performing work. The load being taken up by the bearings at any given point in time may be represented by directional force vectors. The initial vibrations in the assembly coming through the bearings comes from these loads. The origin of the load component of bearing noise occurs at the center of the turbine shaft assembly where the bearings are mounted. The exact point of the force vector origin depends upon the configuration of the bearings. The magnitude and direction of the force vectors changes as the tool is repositioned to remove material from tooth surfaces. Additional vibrations get generated form the operational characteristics of the bearings as the load transfers from the inner races through the roller assemblies to the outer races and ultimately into the drill head. The vibrations from these sources radiate out to the surface of the dental drill head. Once the vibrational energy reaches the surface of the tool, it transfers into the gas medium of atmospheric air, where any vibrations within the range of frequencies audible to the human ear become problematic.

What is needed, therefore, is a method that identifies the source or sources of vibrational noise and a device the limits and otherwise controls the sound that is emitted from such devices.

BRIEF SUMMARY OF THE INVENTION

The invention is a sound control device for pneumatically driven mechanical devices, such as pneumatic dental drills, that mitigates or eliminates sound coming off of the pneumatically driven devices by creating a sealed intermediary gas medium between the atmosphere and the device's exhaust airstream and/or surfaces of the devices where significant portions of the vibrational energy gets generated, and a related method of deploying and using such a device.

This intermediary gas medium is integrated into a sealed air circuit for the drive and exhaust air, which is subjected to externally generated vacuum, then optionally piped through a conventional muffler and/or piped to a location remote from the area of operation before being released into atmosphere. Vibrational energy coming off of the pneumatically driven device within the sealed air circuit transfers into the intermediary gas medium. This captured portion of the total vibrational energy should comprise a majority of the noise coming off of the pneumatically driven device. This captured portion of the vibrational energy becomes subject to fluid flow once it transfers into the intermediary gas medium. The oscillations in pressure that have transferred into the intermediary gas medium are carried away in the sealed air circuit with the exhaust air to be broken down in the muffler and/or piped to a remote location before being released to outside atmosphere. The externally supplied vacuum reduces any back pressure on the pneumatic device, facilitating device operation and the extraction of the exhaust air. The vacuum also reduces pressure within the intermediary gas medium. This reduces the transference of vibrational energy from the intermediary gas medium to the materials used to construct the acoustic chamber space, and ultimately to atmospheric air.

For the specific case of the pneumatic dental drill, a drill head on the dental drill is encased in a cover that creates an air pocket space around the parts of the head that contain the bearings and air turbine to create the intermediary gas medium. This air pocket space is also referred to as an acoustic chamber space and the components that make up the cover are also referred to as an acoustic chamber assembly. The acoustic chamber space created by the acoustic chamber assembly exists between the surface of the drill head, which contains an air turbine and bearings, and an inside of the acoustic chamber space. The acoustic chamber space is sealed to the outside atmosphere using O-rings and gaskets at points where the device could be exposed to the atmosphere outside of the device. The operational face of the drill remains exposed to atmosphere for replacement of a drill burr, and to allow optional water flow through the device, in a manner similar to conventional drills, to provide cooling at the drill burr. Forced air to drive the drill's turbine is provided through piping that is similar to that of the conventional dental drill configurations.

Exhaust air from the turbine passes into the acoustic chamber space through the exhaust port in the back of the drill head. The inside of the acoustic chamber space is connected to the inside of a drill handle through an aperture in the neck of the drill and a passage machined into a neck block of the drill assembly. The neck block is connected to an internal exhaust pipe contained within the drill assembly handle. The internal exhaust pipe is connected to a modified drill end cap. The exhaust air passes through an exhaust port in the drill end cap where interconnected piping forms a conduit to the vacuum source and optional muffler to complete the sealed air circuit for release of the exhaust air into atmosphere. A version of the existing International Organization for Standardization B ("ISO-B") 'Midwest' coupler end pieces, modified to provide 3 holes, connects to the exhaust air piping. The other openings in the modified ISO-B Midwest coupler are used for drive air supply, and water supply to the drill burr work area.

The vibrational characteristics of the new dental drill are changed due to the addition of the acoustic chamber assembly. The acoustic chamber assembly is made from a thermosetting or other suitable polymer, which has a different harmonic frequency than the base metal of the rest of the dental handpiece. The material needs to withstand the autoclave sterilization process. As long as the harmonic frequency of the cover that creates the acoustic chamber space is lower than the harmonic frequency of the existing dental drill assembly, the total harmonic frequency of the complete assembly is lower, thereby reducing the sound level of the high frequency vibrations that come off of the assembled device that go straight into atmosphere.

Finally, there are some noise dampening effects as a result of the design. Some of the sound energy from the bearing and turbine vibrations are transmitted through the acoustic chamber assembly directly into atmosphere. Any sound that emanates through the exterior walls of the acoustic chamber assembly disperses directly to atmosphere. That component of the dental drill sound is attenuated and frequency filtered through the materials used to construct the acoustic chamber assembly thereby reducing the overall noise. This effect is analogous to the sound of music passing through a wall of a building. Much of the high frequency sounds are filtered by the wall. The lower frequency sounds get through but are quieter.

BRIEF DESCRIPTION OF THE DRAWINGS

The present invention is described with reference to the accompanying drawings. In the drawings, like reference numbers indicate identical or functionally similar elements. The drawings are not drawn to scale.

DETAILED DESCRIPTION OF THE INVENTION

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art.

Figure 3:
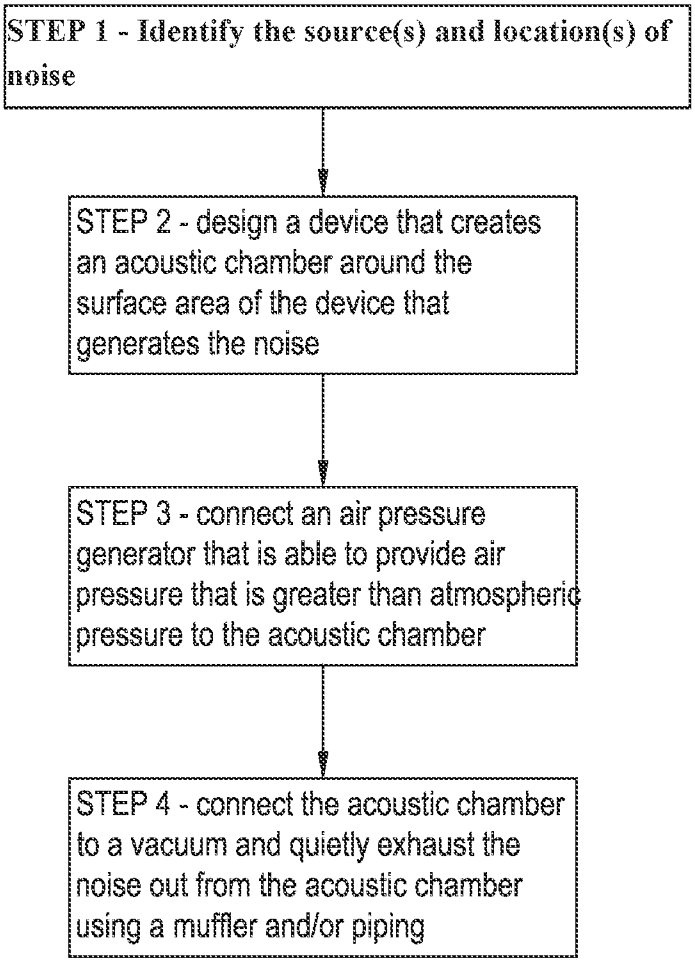
FIG. 3 is a flow chart illustrating the method.

FIG. 3 illustrates the method 1000 according to the invention, which includes the following primary steps: 1) identify the primary and/or problematic source or sources of noise; 2) design a device that creates an acoustic chamber, which is a sealed chamber around the surface area of the device that generates the noise; 3) connect an air pressure generator that is able to provide air pressure that is greater than atmospheric pressure to the acoustic chamber; 4) connect the acoustic chamber to a vacuum to restore drive efficiency, to carry the airflow through an optional muffler assembly to quietly exhaust the noise out from the acoustic chamber, and/or to carry the airflow to a location remote from the work area.

Regarding the first step in the method, the primary sources of the noise with most pneumatic devices are the vibrations that pass through all the interconnected components throughout the assembly to reach the surface of the device, and/or the vibrations that are carried in the exhaust air flow to transfer into the gas medium of atmospheric air where vibrations of suitable frequencies/wavelengths become audible sound to the human ear. The origin points of those vibration sources move as the devices operate and are used for their designed functions to perform work; vibrations are continuously generated while the tools are in operation. As such, the user practicing the method must first identify the source of the vibrations and understand how those vibrations travel from the source to exit the device.

Rotational vibrational energy may come from mechanical assemblies like bearings. Reciprocating vibrational energy may come from the sliding action of a piston. Combustion vibrational energy may come from burning of air-fuel mixture to use that energy for work. The source of the vibrational energy that could become sound is not important to the application of the method. The configuration of the operating mechanical device is important to the application of the method. User Guides/Assembly Manuals for the specific devices will be good references for identifying the primary sources of operational vibrations.

Regarding step 2, a sound control device is designed to create a sealed acoustic chamber around the surface of the mechanical device, enclosing the area where the vibrational energy primarily gets generated. Sound is an oscillation in pressure propagated in a medium. The medium may be solid, liquid or gas. In the case of a gas medium, the medium may take a number of suitable conventional forms, such as, atmospheric air; or a combination of cooling air drawn in from the atmosphere with combustion exhaust gases expelled from the mechanical device; or simply the drive air being exhausted from a device's turbine assembly. A solid medium could be, for example, steel, drywall or glass. Water is often a suitable liquid medium for the propagation of vibrational energy.

The oscillation is triggered by vibrations. Once created, the vibrational energy radiates out in all directions from its point of origin until all its energy is completely dissipated using multiple mediums if necessary. The dissipation of sound follows the principal that a material system will proceed towards its lowest energy state. The acoustic chamber created by the acoustic hood creates a gas medium that captures vibrational energy that radiates in that direction. The gas medium may take a number of suitable conventional forms, such as, atmospheric air; or a combination of cooling air drawn in from the atmosphere with combustion exhaust gases expelled from the mechanical device; or simply the drive air being exhausted from a device's turbine assembly. Standard elastomeric and polymeric seal materials may be used to seal the chamber. The type of seal is also not restricted using the method. Acoustic chambers may be designed using O-rings, gaskets, and/or liquid seals.

At the third step, a conventional air pressure generator is connected to the acoustic chamber to provide air pressure that is greater than atmospheric pressure or 14.7 psi average. The positive air pressure provides directional flow in the overall piping schematic of the method.

During the fourth step, the acoustic chamber is connected to a vacuum generator and optional muffler assembly to quietly exhaust the vibrational energy away from the vicinity of the operator, and optionally break down the vibrational energy before releasing it to atmosphere at a reduced sound level. The vacuum pump draws both the positive air flow from step 3 and the generated vibrational energy that comes off of the surface of the device enclosed by the acoustic chamber.

Figure 1:
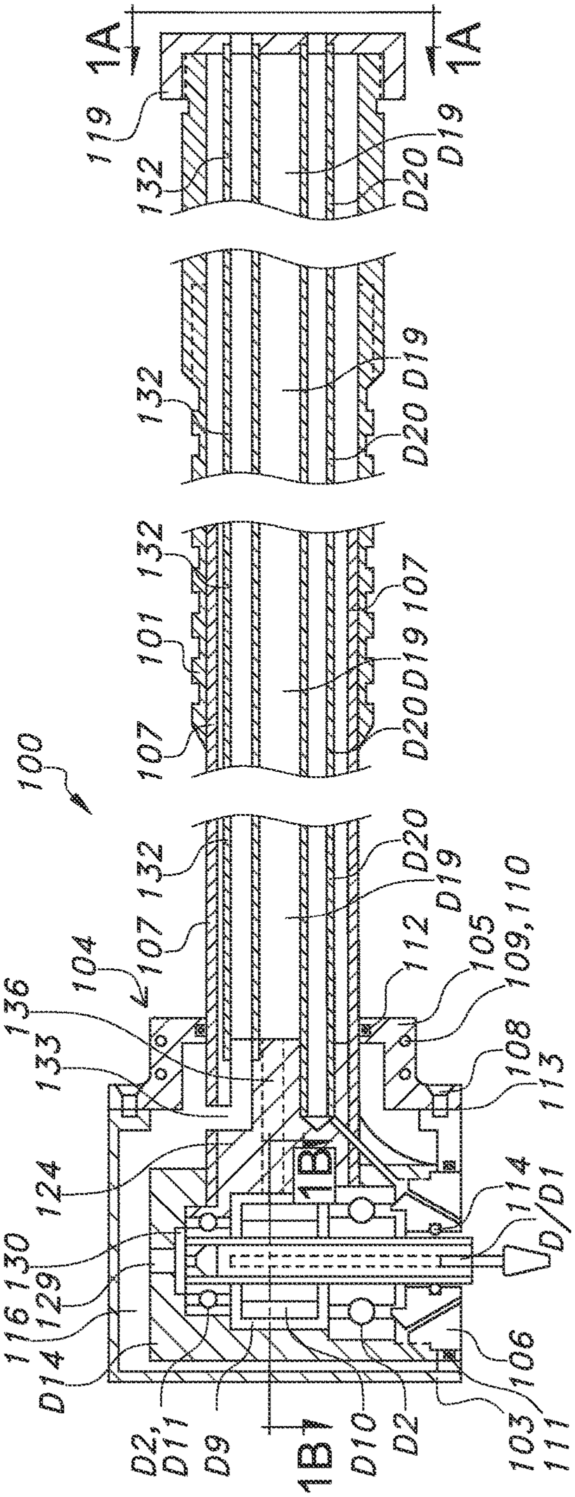
FIG. 1 is a cross sectional view of the acoustic chamber fitted onto a conventional dental drill for use in the method according to the invention.
Figure 2:
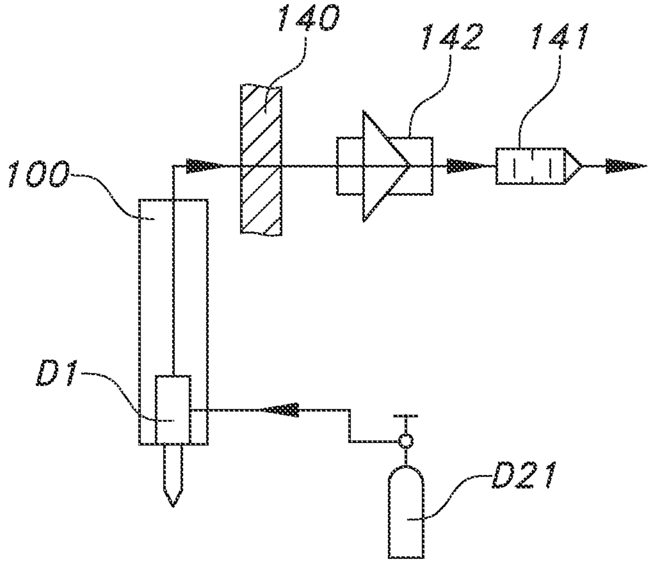
FIG. 2 is a piping schematic for the vacuum system that draws the drive air away from the device.

One exemplary application of the method is to reduce the offensive noise coming off of a pneumatic dental drill D. FIGS. 1-3 illustrate a sound limiting device 100 for use in practicing the steps in the method. In this particular example the sound limiting device 100 is designed to work with the dental drill D. This is but one example and similar assemblies may be constructed for other pneumatically driven mechanical devices. The sources of noise being addressed by the invention in the pneumatic dental drill D, specifically, are the vibrations from air passing over the tips of the drill's D turbine blades as the drill's D shaft assembly D1 rotates, and from load being taken up by the drill's D bearings D2. The sound limiting assembly 100 creates an airtight enclosure around a conventional pneumatic device, such as the dental drill D, allowing for the operational end of the device D, such as a drill head to be exposed for use in the conventional sense and allow for a supply of compressed air to power the device, also in the conventional manner.

The sound limiting assembly 100 is adapted to fit around and secure to a conventional drill D and includes an acoustic chamber assembly 101 that includes an acoustic hood 103, a right acoustic collar 104, and a left acoustic collar 105. Right and left conventions on the acoustic collars 104, 105, are determined by viewing a drill burr face on the drill with the drill head up and the drill handle down.

The acoustic chamber assembly 101 fits tightly to the drill assembly at two points, the first point being a modified retaining collar 106 and the second point being a drill neck sleeve 107. The acoustic chamber assembly 101 may be assembled in a number of conventional manners, for example using self-drilling screws 108 and/or by bolts 109 and nuts 110. The acoustic chamber assembly 101 is sealed to external atmosphere by three O-rings, 111, 112, 114, and by a gasket 113. The O-ring 114 seals the rotor/drill burr shaft assembly D1 to atmosphere. In some drill designs clearance was included in the device between the rotor/drill burr shaft assembly D1 and the modified retaining collar 106 to permit axial air flow towards the work area to help clear material being removed from tooth surfaces. In these designs the O-ring 114 may be eliminated from the design to retain that feature while still maintaining sound control benefits. The modified retaining collar 106 contains channels to allow cooling water to exit the drill face and cool the drill burr at the end of rotor/drill shaft assembly D1, in a manner similar to conventional drill designs. The acoustic chamber assembly 101 creates the acoustic chamber space 116 around the drill head that contains the rotor/drill burr shaft assembly D1 and the bearings D2.

A sealed drive and exhaust air circuit for the pneumatic component of the device is also created. An ISO-B 'Midwest' style End Cap 119 per ISO 9168:2009 that is modified to provide 3 holes is designed to seal the drill handle to atmosphere. A 3-hole ISO-B End Cap 119 is provided for a drive air connection port at D3, an air exhaust port at 121, and a coolant water feed connection port at D5. The 3-hole ISO-B End Cap 119 uses an existing ISO-B quick connector design for the drive air at D3, the exhaust piping at 121, and for the coolant water at D5. These are conventional connections, whereby drive air is supplied by an external air pressure generator via a hose connect to the port D3, exhaust air is extracted through port 121 by a conventional external vacuum pump, and coolant water may be supplied through port D5 by an external water source and pump.

Figure 1A:
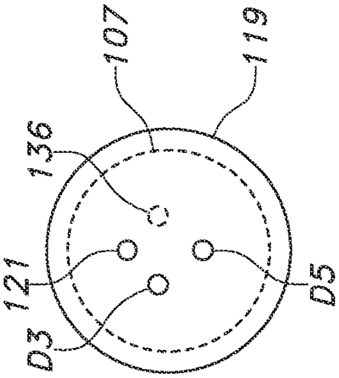
FIG. 1A is an end view 1A-1A of the modified ISO-B 'Mid-west' coupler.
Figure 1B:
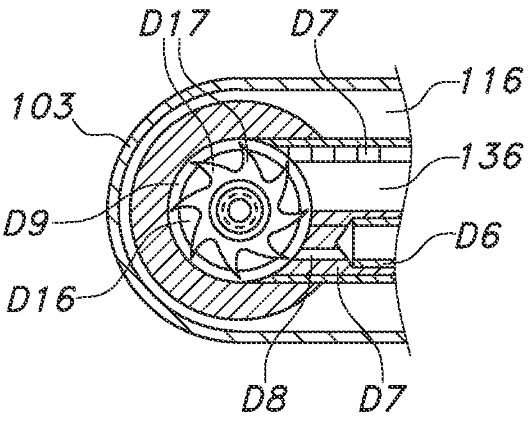
FIG. 1B is a cross sectional view 1B-1B of the acoustic chamber and conventional drill head.

The ISO-B End Midwest Cap 119 drive air connection port D3 is connected to an air inlet tube D6 that terminates in the neck block 124 as shown in FIG. 1B. A longitudinal inlet orifice D8 allows communication between the air inlet tube D6 and a second chamber portion D9 that contains the turbine D10. The second chamber portion D9 communicates to an adjacent first chamber portion D11 that houses the bearing D2 in FIG. 1. The first chamber portion D11 communicates to the exhaust aperture 129 through an annular recess 130 in the drill housing D14. The exhaust aperture 129 communicates to the acoustic chamber space 116. The acoustic chamber space 116 is connected to the air outlet tube 132 through an aperture in the drill neck sleeve 107 that is aligned with exhaust passage 133 that is machined into the neck block 124. The air outlet tube 132 fits into the neck block 124 for a sealed connection. The opposite end of the air outlet tube 132 fits into the modified 3-hole ISO-B End Midwest Cap 119 to complete the drive and exhaust air circuit within the device 100.

Operational Description: Drive air goes into the existing drive airline connector in the ISO-B End Midwest Cap 119 at the drive air connection port at D3 as shown in View A-A of FIG. 1A. The drive air passes through the air inlet tube D6 into the longitudinal inlet orifice D8 that is machined into the neck block 124 as shown in View B-B FIG. 1B. The drive air catches the turbine blade pockets D16 between the Turbine Blades D17 to cause rotation of the rotor/drill burr shaft assembly D1. Diametrically opposed to the longitudinal inlet orifice D8 is a scavenging passage 136 in the neck block 124 that communicates to the interior D19 of the pneumatic dental drill assembly D and exterior to the air inlet tube D6, the air outlet tube 132, and the water feed tube D20.

Referring back to FIG. 1, after driving the rotor/drill burr shaft assembly D1, the drive air exhausts to the acoustic chamber space 116 through the first chamber portion D11, annular recess 130, and the exhaust aperture 129.

Vibrational energy coming from the operation of bearings D2, and airflow over the turbine D10 transmits into the gas medium of the acoustic chamber space 116. The oscillations in pressure that come from the vibrational energy becomes subject to fluid flow as it enters the exhaust air that drives the rotor/drill burr shaft assembly D1. As drive air continues to be passed into the drill to operate the rotor/drill burr shaft assembly D1, the combined exhaust air and vibrational energy pressure oscillations flow through the aperture in the drill neck sleeve 107 and the aligned exhaust passage 133 in the neck block 124. The exhaust air passes into the air outlet tube 132 to the modified ISO-B End Midwest Cap 119 at the air exhaust port at 121.

Referring to FIG. 2, this drawing shows a high-level piping schematic for the sound control method of the invention. Drive air supply D21 goes into the sound limiting assembly 100 to drive the rotor/drill burr shaft assembly D1. The combined exhaust air and vibrational pressure oscillations pass through an optional wall/sound enclosure 140 and then gets pushed to an optional muffler/silencer 141 for the sound to be gradually broken down into non-offensive noise levels to be released to atmosphere. The muffler or silencer 141 is a conventional device, similar to those found, for example, on conventional lawnmowers that are intended for residential use. Vacuum, applied by an external source 142, is used to facilitate the extraction of the exhaust air and vibrational pressure oscillations.

It is understood that the embodiments described herein are merely illustrative of the present invention. Variations in the steps of the method and/or construction of the assembly may be contemplated by one skilled in the art without limiting the intended scope of the invention herein disclosed and as defined by the following claims.

What is claimed is:

1. A sound limiting device that is adapted to secure to a mechanical device having a mechanical device outer surface, a mechanical device operational end and a mechanical device external component connection end, the sound limiting device comprising:

an acoustic chamber that includes an acoustic hood that is configured to fit around the mechanical device operational end and a retaining collar that is configured to seal around the mechanical device outer surface, the retaining collar further adapted to allow external access to the mechanical device operational end;

the acoustic chamber further including a neck sleeve, the neck sleeve configured to couple with the acoustic hood on one end and to an end cap on the other end to seal the mechanical device from an external atmosphere; and a vacuum pump connected to the end cap, the vacuum pump configured to extract exhaust air and vibrational energy out from the acoustic chamber.

2. The sound limiting device of claim 1, further including a gas medium in the acoustic chamber.

3. The sound limiting device of claim 1, further including a right acoustic collar and a left acoustic collar, the acoustic hood, right acoustic collar, and left acoustic collar adapted to fit tightly around the operational end.

4. The sound limiting device of claim 1, wherein the acoustic chamber is sealed from the external atmosphere by o-rings and a gasket.

5. The sound limiting device of claim 1, wherein the end cap includes an air exhaust port, air connection port, and water feed port.

6. The sound limiting device of claim 5, further including a connection to a separate muffler device.

* * * * *